(12) United States Patent
Stewart et al.

(10) Patent No.: US 7,813,114 B2
(45) Date of Patent: Oct. 12, 2010

(54) UNIVERSAL ATTACHMENT FOR COMPUTER PERIPHERAL EQUIPMENT

(75) Inventors: Aaron M. Stewart, Raleigh, NC (US);
Brian H. Leonard, Austin, TX (US);
Shawn R. Sowers, Raleigh, NC (US);
John D. Swansey, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 145 days.

(21) Appl. No.: 11/648,712

(22) Filed: Dec. 29, 2006

(65) Prior Publication Data
US 2008/0158811 A1   Jul. 3, 2008

(51) Int. Cl.
*G06F 1/16* (2006.01)
*H05K 5/00* (2006.01)
*H05K 7/00* (2006.01)

(52) U.S. Cl. .............. 361/679.23; 361/679.02

(58) Field of Classification Search ......... 361/686, 361/683, 679.02, 679.23
See application file for complete search history.

(56) References Cited

U.S. PATENT DOCUMENTS

| | | | | |
|---|---|---|---|---|
| D383,475 S * | 9/1997 | Yamauchi et al. | ........ | D16/202 |
| 6,431,507 B2 * | 8/2002 | Prather et al. | ........ | 396/421 |
| 6,663,066 B1 * | 12/2003 | Hong | ........ | 248/231.41 |
| 6,679,463 B1 * | 1/2004 | Chen | ........ | 396/428 |
| 6,738,094 B1 * | 5/2004 | Minami et al. | ........ | 348/373 |
| D515,613 S * | 2/2006 | Holmes et al. | ........ | D16/242 |
| D523,050 S * | 6/2006 | Bahroocha et al. | ........ | D16/202 |
| 7,093,811 B2 * | 8/2006 | Wu | ........ | 248/229.12 |
| 7,202,903 B2 * | 4/2007 | Lin et al. | ........ | 248/689 |
| 7,219,866 B2 * | 5/2007 | Depay et al. | ........ | 248/229.22 |
| 7,389,964 B2 * | 6/2008 | Ye | ........ | 248/231.61 |
| 7,431,253 B2 * | 10/2008 | Yeh | ........ | 248/286.1 |
| 2005/0141182 A1 * | 6/2005 | Ma et al. | ........ | 361/683 |
| 2006/0127082 A1 * | 6/2006 | Sitoh et al. | ........ | 396/428 |

FOREIGN PATENT DOCUMENTS

| | | |
|---|---|---|
| JP | 09-128091 | 2/1995 |
| JP | 09128091 A * | 5/1997 |

* cited by examiner

*Primary Examiner*—Jayprakash N Gandhi
*Assistant Examiner*—Adrian S Wilson
(74) *Attorney, Agent, or Firm*—Ference & Associates LLC

(57) ABSTRACT

A mounting device for computer peripheral equipment. Preferably included are two spring arms, friction boots mounted on the ends of the spring arms, a non-skid pad and a rotating platform. The rotating platform ensures that the non-skid pad can be positioned between a first position, where the pad and friction boots cooperate to grip computer display bezels over a first range of bezel thicknesses and a second position, where the pad and friction boots cooperated to grip computer display bezels over a second range of bezel thicknesses. Also, the pad and friction boots are preferably dimensioned so as to render the entire mounting device self-standing when desired.

18 Claims, 2 Drawing Sheets

UNIVERSAL ATTACHMENT FOR COMPUTER PERIPHERAL EQUIPMENT

FIELD OF THE INVENTION

The present invention relates to computer-mounted peripheral equipment, such as video cameras and other equipment, and to arrangements for affording the mounting of same to a computer or computer portion.

BACKGROUND OF THE INVENTION

The are multiple types of peripheral computer devices, such as video cameras, that attach to the bezel, or upper edge or surface, of a stand-alone computer display or a notebook computer display. (The bezel, essentially, is the upper ridge or ledge of a frame element for a computer screen. In a notebook or laptop computer, the bezel will be in an upper position once the notebook or laptop computer is opened from its closed position and the screen is visible to the user in an operating capacity.) Many such peripheral devices can also stand freely on a work surface. In addition to video cameras (or USB cameras), such devices can include, but are by n means limited to, microphones and keyboard lights.

Computer display bezels, of course, are formed in a great variety of dimensions and shapes. Since many peripheral devices are not custom-made for particular computers or display bezels, they often need to be sufficiently versatile as to be able to be mounted on a wide variety of computers or bezels.

Normally, to afford such versatility, several known arrangements or accommodations come into play. Multiple stands or parts, included with the peripheral equipment, can well help "customize" the equipment to different computers or bezels, but this then has the great disadvantage of leaving the user with unused stands or parts that ship with the product to accommodate different display bezels and free-stand use but are wasted and merely add to the user's and manufacturer's costs.

A gravity-based method is also conceivable such that the equipment merely rests on top of a display bezel. However, this often proves to be very unstable, especially in the case of notebooks/laptops. A subset of this is the "Velcro" method where bezel and peripheral equipment alike where adhesive Velcro portions are stuck to each and then mate when the equipment is mounted. Apart from the unsightliness of Velcro pieces, the adhesive often wears off and, furthermore, stability continues to be an issue here (especially in the case of larger peripheral equipment).

Finally, attachment media involving one adjustable element (essentially, one degree of freedom in terms of the attachment capabilities afforded), such as a spring-based clip or the like, may serve a useful purpose in one context but not in others; in other words, such methods usually fail to adequately accommodate a wide range of bezel dimensions.

In view of the foregoing, a compelling need has been recognized in connection with providing an attachment arrangement for computer peripheral equipment that is more versatile than conventional arrangements, to the point of even being "universal" in its capabilities.

SUMMARY OF THE INVENTION

Broadly contemplated herein, in accordance with at least one presently preferred embodiment of the present invention, is a mounting device that preferably includes two spring arms, friction boots mounted on the ends of the spring arms, a non-skid pad and a rotating platform. The rotating platform ensures that the non-skid pad can be positioned between a first position, where the pad and friction boots cooperate to grip computer display bezels over a first range of bezel thicknesses and a second position, where the pad and friction boots cooperated to grip computer display bezels over a second range of bezel thicknesses. Also, the pad and friction boots are preferably dimensioned so as to render the entire mounting device self-standing when desired.

In summary, one aspect of the invention provides a computer peripheral equipment support comprising: a mounting region which provides a mount for computer peripheral equipment; a stabilizing arrangement which fixes a position of computer peripheral equipment; the stabilizing arrangement comprising: a first support arrangement; and a second support arrangement; the second support arrangement being biased towards the first support arrangement in a rest position of the second support arrangement; the first support arrangement being displaceable between at least: a first position, wherein a first clearance is provided with respect to the rest position of the second support arrangement; and a second position, wherein a second clearance is provided with respect to the rest position of the second support arrangement; the first clearance being greater than the second clearance.

Furthermore, an additional aspect of the invention provides a computer peripheral equipment ensemble comprising: peripheral equipment for being mounted on a computer; a stabilizing arrangement which fixes a position of the computer peripheral equipment; the stabilizing arrangement comprising: a first support arrangement; and a second support arrangement; the second support arrangement being biased towards the first support arrangement in a rest position of the second support arrangement; the first support arrangement being displaceable between at least: a first position, wherein a first clearance is provided with respect to the rest position of the second support arrangement; and a second position, wherein a second clearance is provided with respect to the rest position of the second support arrangement; the first clearance being greater than the second clearance.

DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

Figure 1:
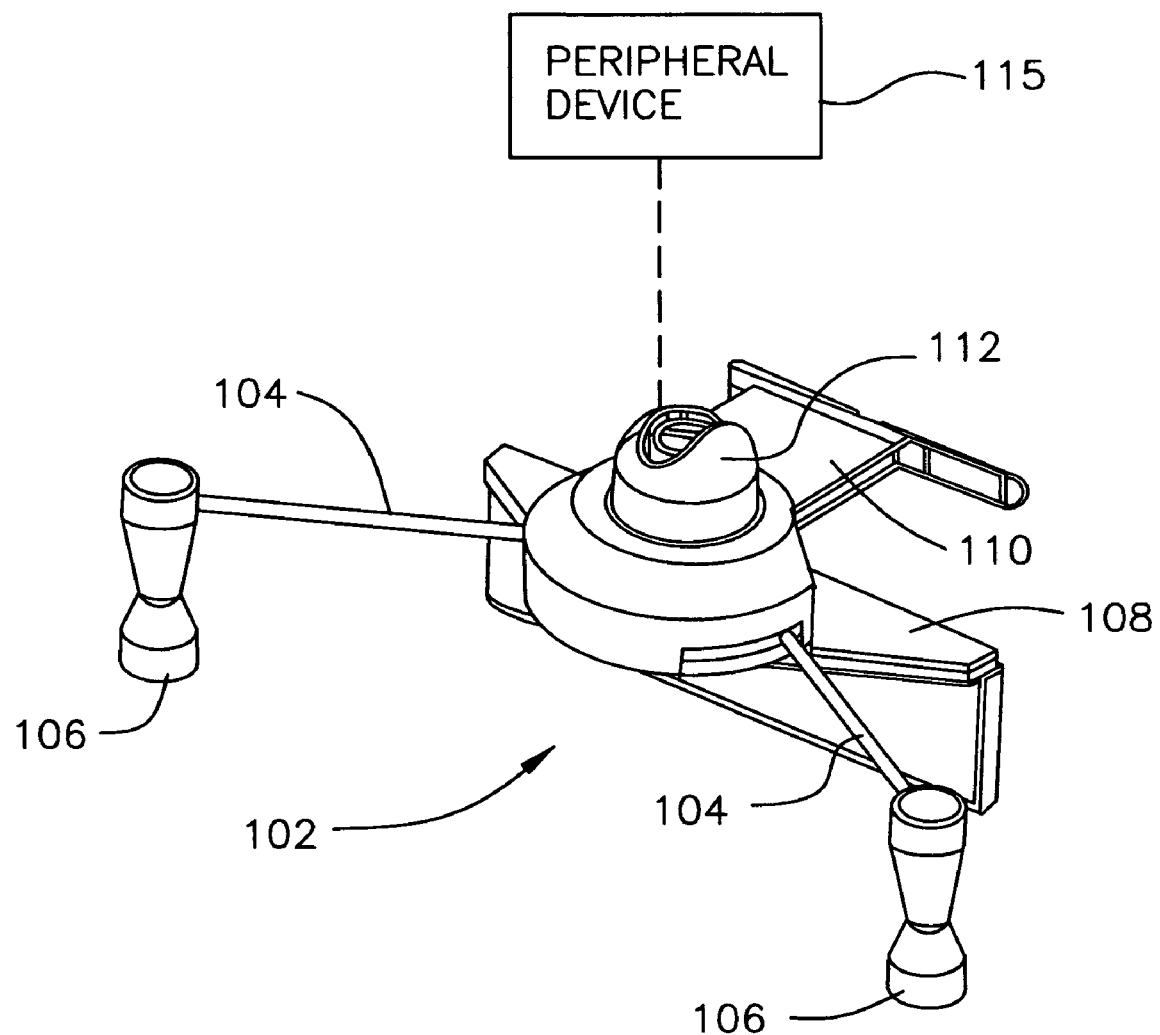
FIG. 1 is a perspective view of a mounting device.
Figure 2:
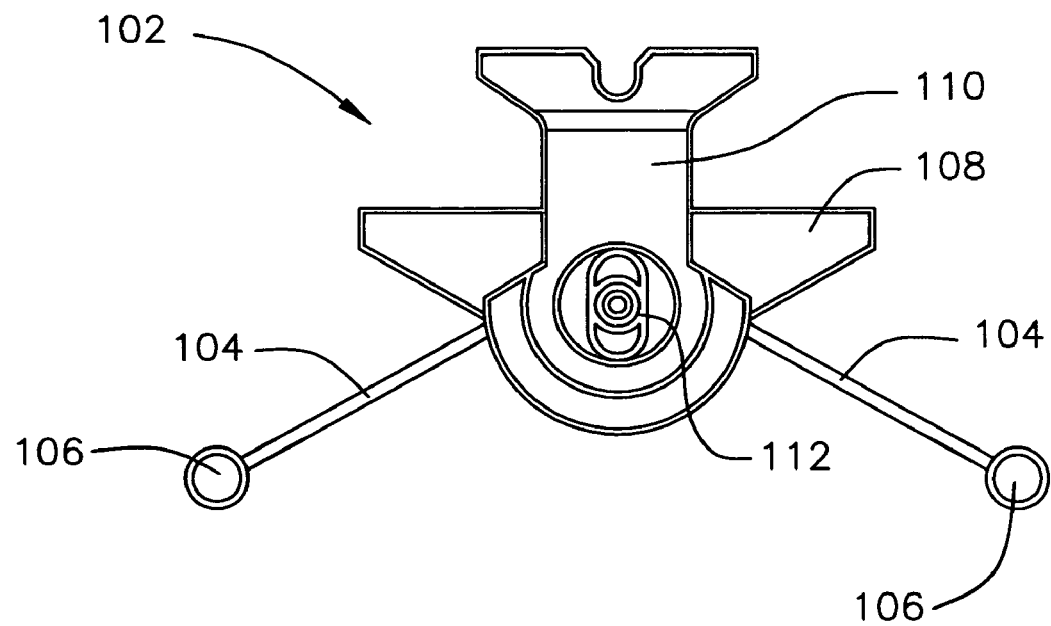
FIG. 2 is a plan view of the device of FIG. 1.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 2, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

In accordance with a preferred embodiment of the present invention, as shown in both FIGS. 1 and 2, a mounting device 102 preferably includes two spring arms 104, friction boots 106, a non-skid pad 108 and a rotating platform 110. Boots 106 are preferably formed from rubber or another material suitable for ensuring a high coefficient of friction between boots 106 and a computer portion (such as a display frame surface). Non-skid pad 108 may likewise be formed from rubber or another material similarly suitable for ensuring a tight friction fit against a computer display frame surface; alternatively, for instance, it could be formed from plastic with a rubber pad disposed thereupon.

Spring arms 104 are preferably formed from steel or a similarly rigid material and are configured to be biased so as to hold friction boots 106 against a computer display frame surface. Any of a wide variety of spring mechanisms may be employed for this purpose, such as a conventional rotational spring.

At an upper portion of mounting device 102, there is preferably provided a tilt and pivot connection 112 that is integrable with a camera or other peripheral device (115). It should be understood that a camera or other peripheral device 115 could already include mounting device 102 integrated therewith. Alternatively, mounting device 102 could be a stand-alone component that a user can freely integrate with a camera or other peripheral device, whether the mounting device 102 is included as part of a "kit" with a camera or other peripheral device or is manufactured and/or sold separately therefrom.

Preferably, rotating platform 110 is positionable between two different positions, to create two sets of overlapping ranges for accommodating a wide range of display bezel thicknesses. At the same time, spring arms 104 are preferably biased so as to help ensure this versatility while keeping the peripheral device in a stable position.

Non-skid pad 108, in FIGS. 1 and 2, is shown in a position in which greater display bezel thicknesses can be accommodated. By virtue of rotating platform 110 or, more precisely, a provision for relative rotational movement between pad 108 and platform 110, in accordance with a preferred embodiment of the present invention, pad 108 can displace by 180 degrees with respect to the orientation shown in FIGS. 1 and 2 and thus create a smaller average clearance between pad 108 and boots 106. Accordingly, by selectively rotating pad 108 between these "greater clearance" and "lesser clearance" positions, there will be afforded at each such position a given range of display bezel thicknesses that can comfortably be accommodated by virtue of the variability provided by the spring arms 104.

Presumably, these different ranges of clearances can be exploited to permit boots 106 and pad 108 to grasp onto a display bezel therebetween. However, it should be understood that in the "greater clearance" position of pad 108 (as in FIGS. 1 and 2), in accordance with a variant application of the embodiments of the present invention, the mounting device can actually be a "stand-alone" structure that can rest atop a particularly large computer monitor (with a large display bezel thickness) or even on a tabletop, providing that (essentially as shown) lower support surfaces of boots 106 and a lower support surface of pad 108 are coplanar or nearly coplanar with one another. Essentially, one will have three stable non-skid contact points to provide adequate support for mounting device 102 and for a peripheral device mounted thereupon.

Though bezel thicknesses vary widely depending on the computer involved, and though the ranges of thicknesses that one may want to accommodate may similarly vary greatly, it is recognized that, by way of an illustrative and non-restrictive example, the range of bezel thicknesses accommodated in the "lesser clearance" position of pad 108 could be between about 10 and about 26 mm while that accommodated in the "greater clearance" position of pad 108 could between about 24 and about 49 mm.

It will be appreciated that if boots 106 have an "hourglass" shape as shown in FIGS. 1 and 2, then irregular bezel shapes can be accommodated. For instance, if there is a protrusive lip on a display bezel, the "hourglass" shape of boots 106 will help provide a secure grip about such a structural irregularity. In general, though boots 106 could essentially be of any size, including virtually any height dimension, that would help maintain a firm grip about a display bezel, preferably they will not be so large as to inordinately obstruct a typical computer display.

The rotational connection between platform 110 and pad 108 may be manifested in essentially any suitable manner. Preferably, such a connection would be configured as to "click" or "lock" into place as soon as the platform 110 and pad 108 are in either of the two diametrically opposite relative positions ("lesser clearance" and "greater clearance") described hereinabove.

Several advantages associated with a mounting device in accordance with the embodiments of the present invention may now be even more readily appreciated.

Generally, the device requires minimal user action and takes can take merely seconds to attach or detach from a computer display. Essentially, it affords a degree of "universality", or applicability to a very wide range of computer displays of greatly varying dimension, that has hitherto been unseen, while is also easily adaptable to a "free-standing" orientation. The three major points of contact provided by the boots and the pad, as well as the biasing of the spring arms, helps keep the mounting device in a very stable orientation. Finally, a spatial compactness of the mounting device, whereby in a "rest" position the spring arms are relatively closer to the pad, allows for easy transport and storage.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A device comprising:
a mounting region which provides a mount for computer peripheral equipment;
a stabilizing arrangement which fixes a position of computer peripheral equipment;
said stabilizing arrangement comprising:
a first support arrangement and a second support arrangement, said first support arrangement comprising a contact surface being rotationally displaceable about a pivot point of a pair of pivotally mounted spring arms of said second support arrangement between at least:
a first position, wherein a first clearance is provided with respect to a rest position of said pair of pivotally mounted spring arms; and
a second position, wherein a second clearance is provided with respect to said rest position of said pair of pivotally mounted spring arms;
said first clearance being greater than said second clearance;
wherein:
said pair of pivotally mounted spring arms are displaceable between said rest position and a maximally extended position; and
said pair of pivotally mounted spring arms are biased towards said first support arrangement in said rest position of said second support arrangement.

2. The device according to claim 1, wherein boots of said pair of pivotally mounted spring arms and a bottom of said first support arrangement combine to render said device self-standing.

3. The device according to claim 1, wherein:
said contact surface comprises a non-skid pad which acts to contact a portion of a computer display frame.

4. The device according to claim 3, wherein said second support arrangement comprises a pair of friction boots.

5. The device according to claim 4, wherein said friction boots comprise a generally hourglass-shaped cross-section.

6. An apparatus comprising:
peripheral equipment for being mounted on a computer;
a stabilizing arrangement which fixes a position of said computer peripheral equipment;
said stabilizing arrangement comprising:
a first support arrangement comprising a contact surface; and
a second support arrangement comprising a pair of pivotally mounted spring arms displaceable between a rest position and a maximally extended position;
said second support arrangement being biased towards said first support arrangement in the rest position of said second support arrangement;
said first support arrangement being rotationally displaceable about a pivot point of said pair of pivotally mounted spring arms between at least:
a first position, wherein a first clearance is provided with respect to said rest position of said second support arrangement; and
a second position, wherein a second clearance is provided with respect to said rest position of said second support arrangement;
said first clearance being greater than said second clearance.

7. The apparatus according to claim 6, wherein boots of said pair of pivotally mounted spring arms and a bottom of said first support arrangement combine to render said apparatus self-standing.

8. The apparatus according to claim 6, wherein:
said contact surface comprises a non-skid pad which acts to contact a portion of a computer display frame.

9. The apparatus according to claim 8, wherein said second support arrangement comprises a pair of friction boots.

10. The apparatus according to claim 9, wherein said friction boots comprise a generally hourglass-shaped cross-section.

11. The apparatus according to claim 6, wherein said peripheral equipment comprises a USB camera.

12. The apparatus according to claim 6, wherein said peripheral equipment comprises one of: a microphone and a keyboard light.

13. An apparatus comprising:
a mounting region configured for mounting thereon computer peripheral equipment;
a stabilizing arrangement configured to fix the apparatus to a plurality of computer display bezel dimensions;
the stabilizing arrangement comprising:
a non-skid pad;
a platform; and
pivotally mounted spring arms having boots attached thereto;
wherein the stabilizing arrangement is configured to permit selective rotational displacement of the non-skid pad about a pivot point of said pivotally mounted spring arms to create a greater and lesser clearance between the non-skid pad and the boots in a resting position of said pivotally mounted spring arms.

14. The apparatus according to claim 13, wherein the pivotally mounted spring arms are biased towards the non-skid pad in a rest position.

15. The apparatus according to claim 14, wherein the selective rotational displacement comprises rotation of the non-skid pad 180 degrees.

16. The apparatus according to claim 14, wherein the pivotally mounted spring arms are biased towards the non-skid pad and rest a first distance from the non-skid pad when said non-skid pad is in a first position.

17. The apparatus according to claim 16, wherein the pivotally mounted spring arms are biased towards the non-skid pad and rest a second distance from the non-skid pad when said non-skid pad is selectively displaced.

18. The apparatus according to claim 13, wherein the boots of the pair of pivotally mounted spring arms and a bottom of the non-skid pad combine to render the apparatus self-standing.

* * * * *